Nov. 12, 1963   G. F. MADER ETAL   3,110,148
CROP STACKER
Filed Oct. 31, 1960   2 Sheets-Sheet 1

INVENTORS
GOTTLOB F. MADER
BY RICHARD C. SCHERER
Carlsen & Carlsen
ATTORNEYS

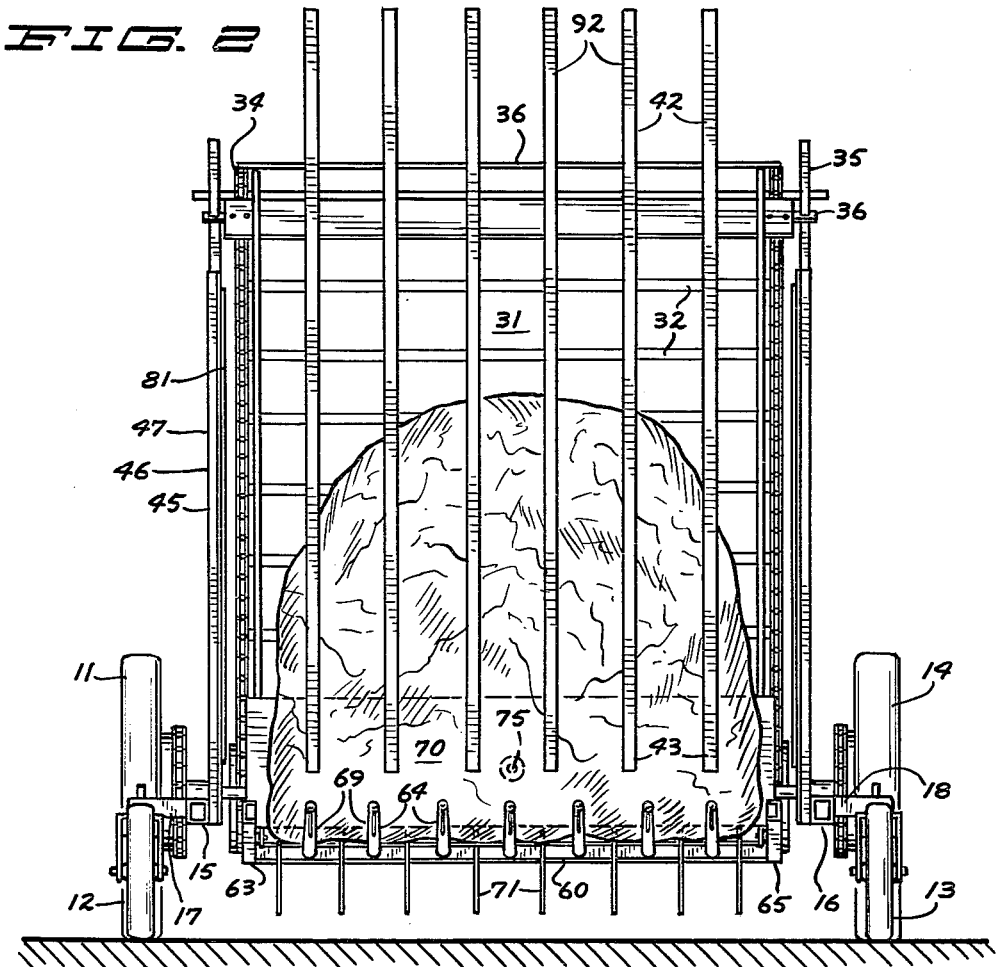
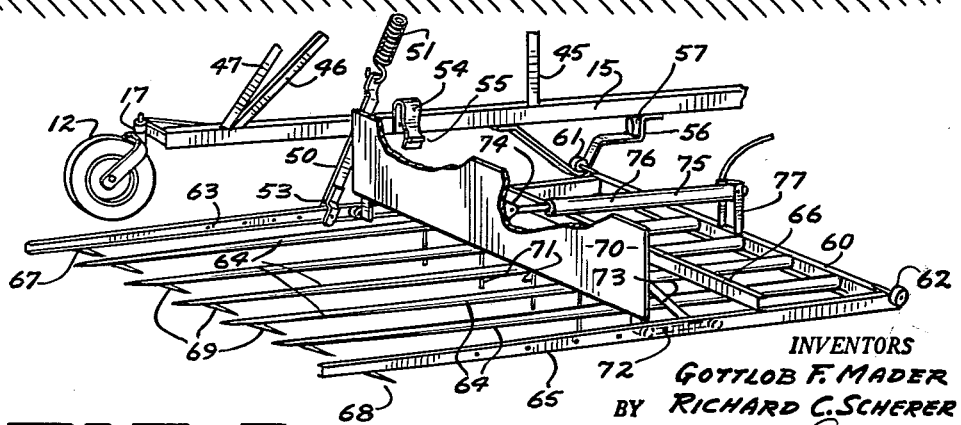

United States Patent Office 3,110,148
Patented Nov. 12, 1963

3,110,148
CROP STACKER
Gottlob F. Mader, Highmore, Hyde County, and Richard C. Scherer, Huron, Beadle County, both of South Dakota
Filed Oct. 31, 1960, Ser. No. 66,170
3 Claims. (Cl. 56—347)

This invention relates generally to the art of harvesting crops and is particularly related to the art of gathering and stacking cut crops for curing and further handling.

An example of the prior art apparatus utilized in this general field is the "haybook" or "sweep rake" which is utilized to gather and for stacks of cut crops to be left in the field for further curing and later picked up, in some manner, for further transportation to a storage pile or building. It has been noted that the size of the cock, or piles, of the cut crop produced in this manner, and also by various other machines, is small and non-uniform. Further, an important consideration in gathering crops in this manner is the initial curing of the cut crops required before gathering into piles and the subsequent curing, sometimes under adverse weather conditions, of the cut crop after it has been gathered and placed in such pile or cock. It is easily seen that apparatus capable of producing uniform cocks, gathering relatively "green" or uncured cut crops and producing cocks which may cure rapidly under various weather conditions, is a highly desirable and worthwhile contribution to this art, not only from the standpoint of labor saved, but also in the quality of the product resulting therefrom.

It is therefore an object of the present invention to provide apparatus and machinery for use in gathering and stacking, or cocking, cut crops which produces the highly economical result of providing faster operation both through the production of uniform cocks and the time saved in providing the ability to gather relatively green cut crops. Further, the distinct advantage of a much higher quality product is also obtained.

It is a further object of this invention to provide apparatus which may be utilized to automatically form piles or cocks of cut crops in a manner so as to produce a density conducive to rapid curing and an orientation of the crop in the pile which is highly resistant to weather conditions.

It is a still further object of this invention to provide apparatus and machinery for producing uniformly large cocks of predetermined size and weight automatically as the apparatus or machinery is propelled across an area containing a freshly cut crop.

These and other more detailed and specific objects will be disclosed in the course of the following specification, reference being had to the accompanying drawings, in which FIG. 1 is a side elevational view of the apparatus of the present invention.

FIG. 2 is a rear elevation.

FIG. 3 is a perspective drawing in which portions of the apparatus have been omitted for clarity of illustration and description.

Figure 1:
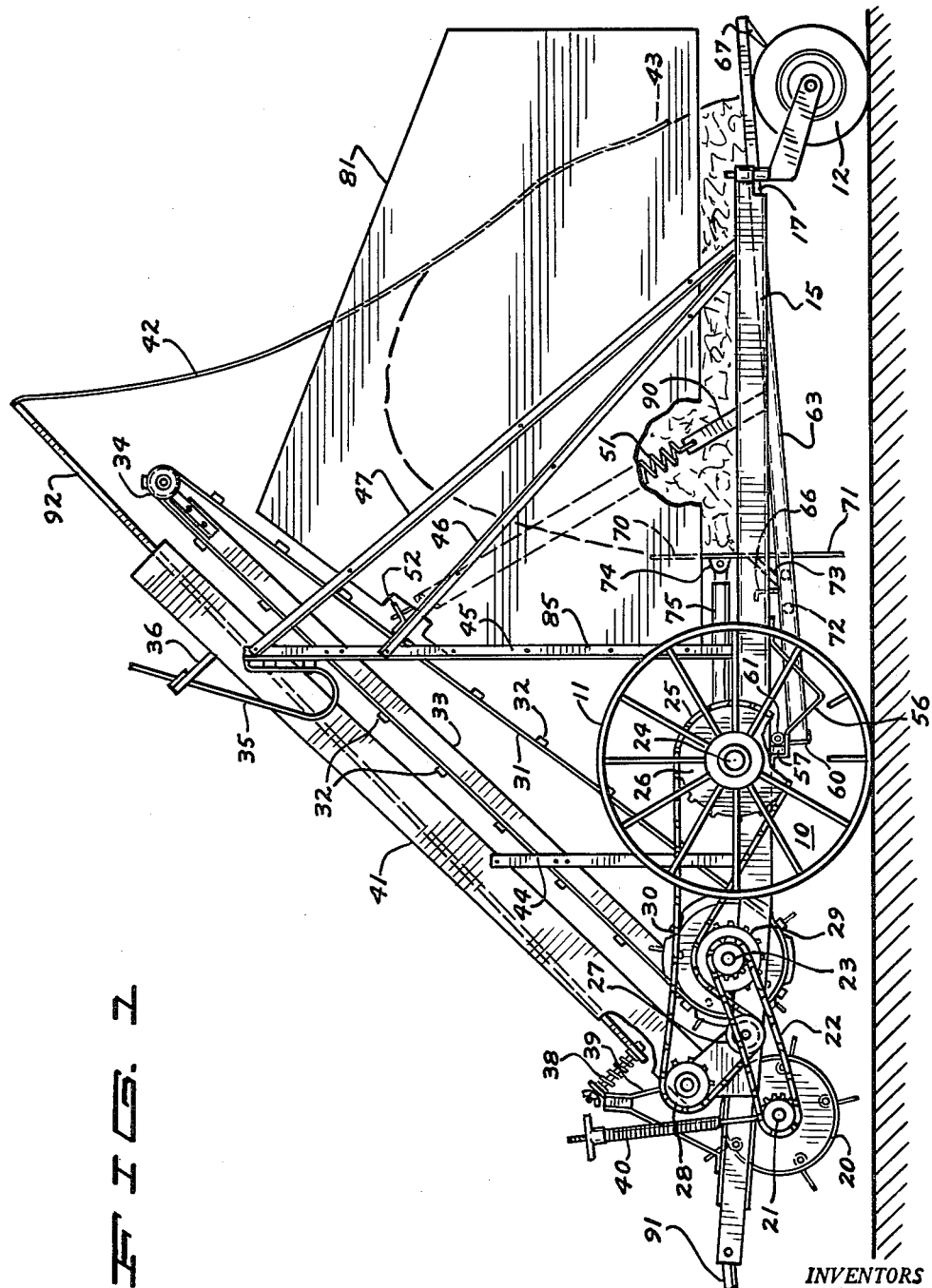

Briefly, the apparatus includes a wheeled chassis capable of being propelled or drawn over an area containing a cut crop which has been operated upon by conventional mowers and subsequently may have been placed in a windrow-like formation by equipment well known in the art. Mounted upon the chassis is a conventional picker and the well known conveyor, both of which are operated by a drive means driven from one of the wheels mounted on the chassis and which are adapted to pick up and tend to orient the stems of the cut crop and subsequently convey it to a discharge point vertically above the center of gravity and to a point in space substantially over the rear portion of the chassis. A loading platform is carried by the chassis in a position underneath the discharge point of conveyor and is surrounded by various members tending to confine the discharge crop into a pile or cock. When the cock reaches a predetermined weight, the platform automatically releases the load and it is discharged onto the surface of the ground and left for further curing and processing.

Referring now particularly to FIGS. 1, 2 and 3 in which like reference characters are applied to like elements, the chassis is comprised of longitudinal members 15 and 16 which are held rigidly and in spaced relationship by cross members rigidly attached thereto (not shown) and which terminate in their forward end by a draw bar 91 and at each of the rearwardly extending ends in members 17 and 18 respectively having attached thereto swiveling wheels 12 and 13 respectively. A pair of wheels 11 and 14 are journaled for rotation about an axle 24 that is suitably attached to the chassis slightly forward of the center of the longitudinal chassis members 15 and 16. Also firmly attached to the longitudinal chassis members 15 and 16 are upright members 44, 45, 46 and 47 (only one set of which is shown) which are used to support various elements to be described below.

A pick-off cylinder 20 is positioned near the front end of the chassis and is journaled for rotation about an axle member 21 and that is in turn rotatably supported by an adjustable support means 40 (of which only one is shown in the side elevation view of FIG. 1) to provide for vertical adjustment of the cylinder 20 with respect to the surface of the ground over which the apparatus is propelled. A drive cylinder 30, which is a part of the conveyor mechanism, is journaled for rotation about an axle 23 which is rotationally affixed at its opposite ends to the longitudinal members 15 and 16. Drive cylinder 30 is operatively connected to sprocket 26 through a chain drive 25 which encompasses an idler sprocket 28 and an adjustable idler sprocket 27 and is operatively connected to sprocket 29 that is in turn connected to drive cylinder 30. It may be noted that sprocket 26 is securely affixed to axle member 24 driven by wheels 11 and 14. Pick-off cylinder is operatively connected to sprocket 29 through a further chain drive 22. A support for the conveyor is comprised of members 33 which have affixed to their uppermost ends rotational elements 34. Member 33 is appropriately affixed to further support members 44 and 45 and is held thereby in the relationship shown. It may be seen that the conveyor is comprised of an endless apron, or belt, 31 that is looped around and encompasses element 34 and drive cylinder 30. Carried upon the outward surfaces of the apron 31 are a plurality of transverse cleat members which aid in moving the cut crop to an elevated position. To aid in orienting the stems of a cut crop in a substantially parallel relationship, a plurality of slat-like members 92 are held in position overlying the top surface of the conveyor. The slats are attached to transverse member 36 at the upper portions thereof and each of the slats is affixed to mounting member 39 and held in position by a spring member 38 at the lower extremity. Transverse member 36 is adjustably and resiliently held in place by a pair of spring members 35 that are in turn resiliently affixed to member 45. A pair of deflection members 41 are positioned on either side of the slat assembly to tend to forestall loss of the cut crop from the edges of the conveyor.

A platform or bed is carried beneath the chassis of the apparatus and is comprised of a transverse member 60 to which is rigidly attached a plurality of tine-like members 64 extending rearwardly and at right angles and a pair of channel-like members 63 and 65 extending from each end thereof in like manner. Positioned at some distance rearwardly of the member 60 and parallel thereto is a channel member 66 which is utilized as a stop for the push-off member (to be explained below) and is also attached to the end members and tine-like members for imparting rigidity to the platform. A push-off member 70 is mounted for forward and aft reciprocating movement by the bracket 73 and the roller member 72 which is adapted to ride in the channel of the end members 63 and 65 on either end of push-off member 70. Depending downwardly from push-off member 70 are a plurality of tine members 71 which are of appropriate length to engage the ground under conditions to be explained below. Spring return actuator 75 having a spring (not shown) contained therein is mounted between the connector 74 on member 70 and bracket 77 on member 60 for providing manual operation of push-off member 70 under the influence of the operator of the apparatus and may be actuated by the application of fluid under pressure to conduit 76. It will be readily apparent that fluid can be supplied to the conduit 76 from any of the well known and conventional operator controlled fluid supply systems commonly found on tractors. The fluid supply system forms no part of the present invention. When fluid is thus applied under pressure to conduit 76, the portion of the actuator 75 secured to connector 74 will, of course, move away from conduit 76 thereby driving the push-off member 70 rearwardly. Rolling pivot members 61 and 62 are positioned at the extremities at the member 60 and are adapted to allow pivotable motion of the platform about the axis formed thereby. Positioned at the rear extremities of the end elements 63 and 65 and the tine elements 64 are the forward extending, downward depending, ground-engaging elements 67, 68 and 69 respectively. It may be seen that the platform may pivot about the axis formed by the bearing or pivot members 61 and 62 in one of two positions as determined by the downward depending brackets 56 which are affixed to the lower portions of longitudinal members 15 and 16 respectively at a location substantially at the center thereof. The platform is further attached to adjustable spring member 51 through member 50, which may be connected in one of several openings provided along the extremity of elements 63 and 65 and serves to provide a bias tending to urge the platform forwardly and in an upward direction. Spring member 51 is adjustably attached to upwardly extending support member 46. A further spring element 54 having a detent 55 positioned thereon is shown attached to longitudinal element 15 in FIG. 3. A like member is placed in corresponding position on longitudinal member 16 and the members cooperate to resiliently latch the platform when it is in its uppermost loading position. Surrounding the area above the platform and suitably attached to the chassis and upright members are a plurality of panel members 81 which are utilized to confine the cut crop into a stack. It may be apparent to one skilled in the art that these panels, where used, may be of any suitable material, such as small mesh or even solid material as indicated on FIG. 1.

Suspended from an area near the point of the discharge of the conveyor at the top extremities of elements 92 are shown a plurality of strap-like elements or filaments 42 having suitable weights 43 attached at their lower extremities. It may be seen that the rear portion only, of the pile or stack, is resiliently confined by these elements but, in light of the present invention, it should be clear to one skilled in the art that the number of these elements and the exact location is determined by the characteristics desired in the accumulated pile or stack and that they may entirely surround the discharge point of the conveyor or, as illustrated here, may be used only at the rear portion thereof. Members 43 need only have the necessary strength and wight characteristics to adequately provide the desirable function of the present invention.

Operation

FIG. 1 shows the platform in its loading position that is the push-off member 70 is in its forward position in which bracket members 73 abut the transverse member 66 of the platform. The bearing pivot members 61 and 62 are in their uppermost forward position of the bracket members 56 and in abutment with the bumper members 57 positioned at the forward end of bracket members 56. The end members 63 and 65 are positioned with respect to the resilient members 54 so that the projection 55 thereon is engaged by the lower edge of the members 63 and 65 to tend to maintain these members in the upward position. During this time, the cut crop is continuously picked up and conveyed upwardly to the discharge end of the conveyor means and falls onto the pile, as shown, in phantom on FIG. 1. As the pile increases in size, the strap like members 42 move in a general outward and upward direction to provide suitable orientation of the crop and forming of the pile. When the pile reaches a predetermined weight, as determined by the upward biasing effect of spring 51 and the detent action provided by members 54, it overcomes these forces and the side members 63 and 65 disengage from the detents and the rear of the platform will fall as it pivots about bearing pivots 61 and 62. When the rear extremities of the members 63, 64 and 65, of the platform, engage the ground, continued forward motion of the apparatus causes a rearward movement of the entire platform and the bearing pivot members 61 and 62 will fall into the lower portion of the members 56. This allows the downwardly depending tine members 71, on the push-off platform 70, to engage the ground also. Further continued forward motion moves the push-off member 70 toward the rear of the platform to aid in removing the load piled thereon. Additional forward movement combined with the frictional engagement of the pile, as it protrudes into intervening space between the tine members 69 causes rapid removal of the pile. The downwardly, forwardly depending members 67, 68 and 69 serve to maintain the platform elements in close contact with ground to aid in fast and efficient removal of the stack. Upon discharge of the load, the force of spring members 51 disengages the platform from the ground and the entire assembly rises in a forward and upward direction to assume the loading position of FIG. 1.

In certain types of harvesting it may be desirable to determine the size of the stacks by weight, as noted in the discussion above, and which results in an entirely automatic operation of our invention. In other methods of harvesting, it is sometimes more desirable to provide even rows of stacks, in both directions, across a field. If this is desirable, the push-off member 70 may be actuated manually through the application fluid under pressure to the spring loaded hydraulic cylinder actuator 75. The movement of push-off member 70 serves to shift the load toward the rear of the platform to initiate the automatic operation and allows the operator to place a stack in the position determined by him. Push-off member 70 is, of course, returned to its initial position through the influence of the spring loading member 76 contained in the hydraulic cylinder 75. A suitable valve mechanism may be employed so that the member 70 is free to move upon ground engagement of its downwardly depending tines in the fully automatic mode of operation.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In apparatus of the class above described; a vehicle including crop gathering and conveying means for conveying a cut crop to a point of discharge above and toward the rear end of said vehicle; a pair of downward depending bearing supports, bearing members movably mounted upon said supports and having at least two positions with respect to the vertical axis of said vehicle; a platform including a transverse member, a plurality of rearwardly extending members and a push-off member mounted for longitudinal movement on said rearwardly extending members, said push-off member including downwardly extending members adapted upon ground engagement to move said push-off member in a rearward direction; means connecting the extremities of said transverse member to said bearing members; and spring biased released means tending to normally hold said platform in a first load carrying position above the terrain over which said vehicle is traveling and responsive to a predetermined load on said platform to release said platform to a second load discharging for ground engagement of at least a portion of said platform and the downwardly extending members of said push-off member and to automatically return said platform to said normal position upon the release of said load.

2. Hay cocking apparatus comprising; a vehicle adapted for movement over an area containing cut crops which are to be collected and formed into cocks for curing and further handling; pick up and conveyor means driven by movement of said vehicle and mounted thereon, said pick up and conveyor means tending to orient the stems of said cut crops so that said stems are substantially parallel and are delivered from the conveyor at an elevated location with respect to the center of gravity of said vehicle; movable platform means including ground engaging members positioned at the rear extremity mounted for rotation about an axis transverse to the longitudinal axis of motion of said vehicle and substantially directly below the delivery end of said conveyor; means normally maintaining said platform in a position substantially above ground level said means being responsive to the weight of crops deposited on said platform to automatically release said platform to ground engaging position to thereby release the crops deposited thereon; and means resiliently confining the crops deposited on said platform so as to tend to maintain the deposited crop stems in parallel relationship so as to form a cock resistant to adverse weather conditions.

3. The apparatus of claim 2 in which the platform means is comprised of a transverse member with rearwardly extending members, at least two of which have forwardly, downwardly extending ground engaging members mounted at the rear extremities thereof.

References Cited in the file of this patent

UNITED STATES PATENTS

| | | |
|---|---|---|
| 829,370 | Crawford | Aug. 21, 1906 |
| 1,227,058 | McClure | May 22, 1908 |
| 1,833,282 | France | Nov. 24, 1931 |
| 2,218,579 | Jones et al. | Oct. 22, 1940 |
| 2,516,769 | Hadden | July 25, 1950 |
| 2,622,386 | Randall | Dec. 23, 1952 |